July 21, 1931.    A. D. BRAASCH ET AL    1,815,491
PICK-UP GUARD
Filed May 25, 1927    2 Sheets-Sheet 1
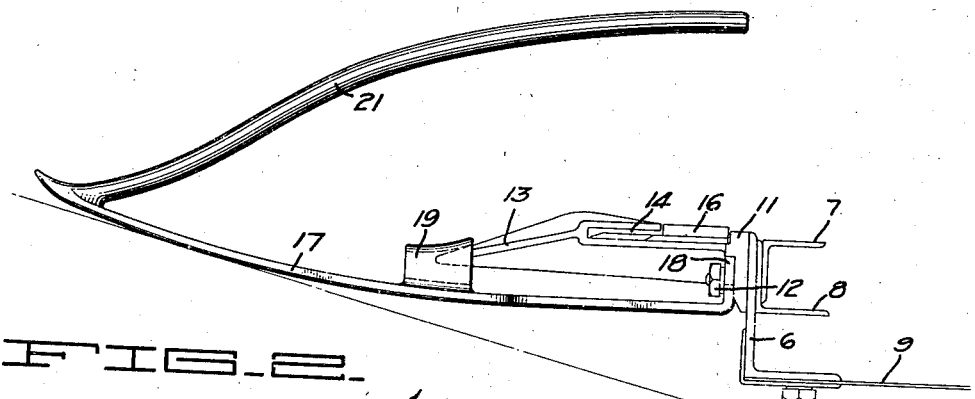
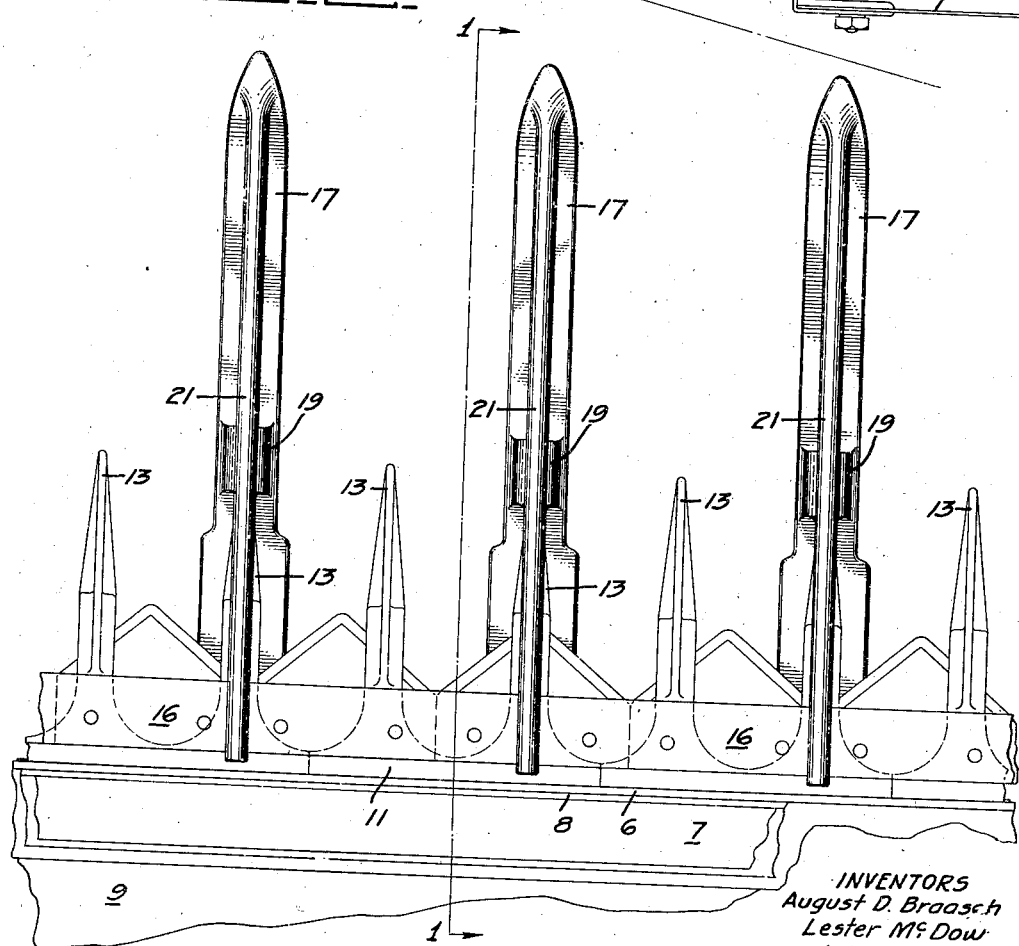
INVENTORS
August D. Braasch
Lester McDow
John Twells
their ATTORNEYS

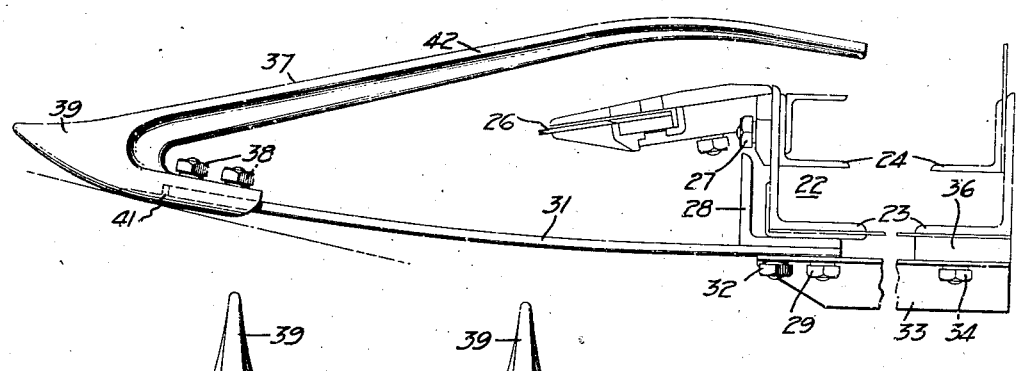
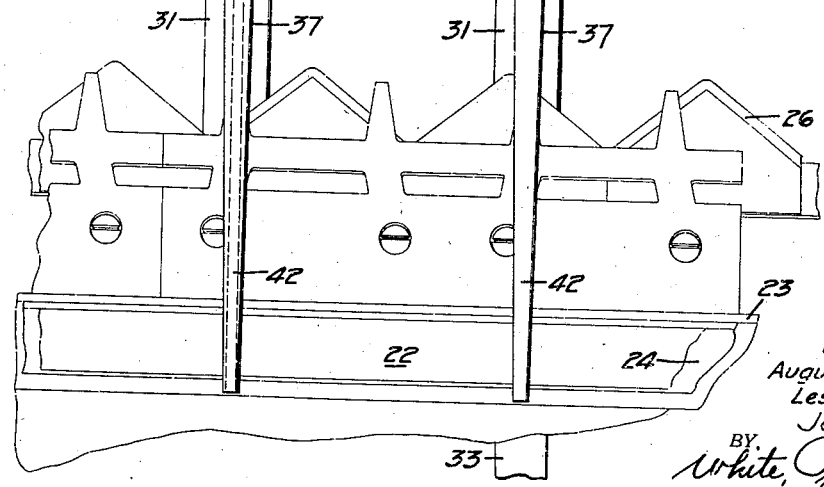

Patented July 21, 1931

1,815,491

UNITED STATES PATENT OFFICE

AUGUST D. BRAASCH, LESTER McDOW, AND JOHN TWELLS, OF STOCKTON, CALIFORNIA, ASSIGNORS, BY MESNE ASSIGNMENTS, TO CATERPILLAR TRACTOR CO., OF SAN LEANDRO, CALIFORNIA, A CORPORATION OF CALIFORNIA

PICK-UP GUARD

Application filed May 25, 1927. Serial No. 194,079.

Our invention relates to guards adapted for use with harvesting machinery and relates particularly to a guard adapted to be attached to the leading portion of a machine having a sickle. Harvesting machines, such as headers as at present constructed are not always well adapted to cut grain which has been driven down and is in a matted condition close to the ground. It is advantageous to operate them with the sickle bar very close to the ground but the sickle guards usually include projecting prongs which then are prone to engage any débris adjacent the ground and become clogged and readily run into the ground if the surface thereof is irregular or hummocky.

It is therefore an object of our invention to provide means for aiding the sickle to cut grain which has been driven down and become matted.

Another object of our invention is to provide means for permitting the sickle to be operated close to the ground of irregular or hummocky contour.

A further object of our invention is to provide means which can readily be attached to existing sickles for adapting them to cut close to the ground and for use with grain which has been driven down.

Our invention possesses other advantageous features, some of which with the foregoing, will be set forth at length in the following description where we shall outline in full those forms of the pick-up guard of our invention which we have selected for illustration in the drawings accompanying and forming part of the present specification. In said drawings we have shown forms of pick-up guard embodying our invention, but it is to be understood that we do not limit ourselves to such forms since the invention, as set forth in the claim, may be embodied in a plurality of forms.

In the drawings:

Fig. 1 shows the pick-up guard in side elevation as it is attached to a sickle on a header, portions of the header being shown in cross section taken on the line 1—1 of Fig. 2.

Fig. 2 is a plan of a sickle with the pick-up guard of our invention attached thereto.

Fig. 3 shows a modified form of pick-up guard in side elevation as it is attached to a header.

Fig. 4 is a plan of the modified pick-up guard attached to the sickle of a header.

The pick-up guard of our invention preferably comprises a yielding strip of material adapted to contact the ground ahead of the sickle to aid the passage of the sickle over the ground.

The pick-up guard of our invention is well adapted for use with almost any type of harvesting machinery employing a sickle and for convenience we have shown it attached to the sickle portion of a header usually forming part of a combined harvester. The header comprises a framework 6 carrying angles 7 and 8 for supporting and partially enclosing a draper, not shown, and which is closed at the bottom by a sheet 9. At the leading side of the framework 6 sickle guards are attached by suitable nuts and bolts 12. Each sickle guard carries a projecting prong 13 in advance of the framework 6 and is also provided with a channel 14 in which the sickle bar 16 operates. The construction as so far described is standard, and as the header is driven over the ground, the prongs 13 interengage the grain while the sickle bar 16 cuts the grain and it falls onto the draper supported by the framework 6.

When the header is driven over irregular ground or hummocks, the prongs 13 are likely to dig in if they are close to the ground, and it is therefore necessary to have the sickle bar 16 at a considerable height from the ground and an appreciable proportion of straw is thereby uncut. Also if the grain has been driven down by rain or wind and has become more or less matted, the prongs 13 must be disposed fairly close to the ground in order to cut the grain. To aid the sickle guard in traveling over the ground, we preferably provide a strip 17 of resilient material, such as spring steel, which is relatively flat in cross section and is arcuate in contour. The trailing end of the strip is turned up forming a flange 18 apertured to be seated on and secured to the framework 6 by a nut and bolt 12. The strip 17 is preferably enlarged adjacent its point of attachment and narrows somewhat toward its advancing end. The strip conveniently ends in a blunt point having a considerable amount of upward curvature. When the header is driven over the ground, the strip 17 is in contact therewith preferably with the upturned leading end spaced somewhat from the ground and the point of contact being intermediate the leading end and the point of attachment to the header. As obstructions are met and irregularities of the ground are encountered, the resilient strip yields to them and tends to lift or lower the header a corresponding amount.

In order to take a portion of the strain from the nut and bolt 12 and also to confine somewhat the motion of the strip 17, we have provided a boss 19, preferably of metal, on the upper side of the strip. The boss is longitudinally apertured with an irregular perforation to accommodate loosely the prong 13 of the sickle. Such loose engagement permits considerable motion of the strip 17 but confines it within limits. We can, of course, provide a relatively close engagement between the prong 13 and the boss 19, but a tight fit tends to make the strip 17 considerably stiffer. The relatively free engagement of the boss 19 and the prong 13 facilitate the quick removal of the strip 17 which is effected by removing the nut 12 and sliding the strip and boss from the sickle.

An additional aid in cutting grain which has been matted and driven down is afforded by a bar 21 preferably of circular cross section and irregular contour which merges smoothly with the leading end of strip 17. The confluence of the bar 21 with the strip not only reenforces the tip of the strip but enters readily below the matted grain and assists in arranging the grain to an advantageous position for cutting by the sickle bar 16. Preferably the bar 21 is considerably more rigid than the yielding strip 17 and in extreme cases, the trailing end of the bar, which overlies the bar 16, can contact with the upper side of the sickle and prevent excess movement of the strip.

We preferably provide on the usual type of sickle a plurality of our pick-up guards, an advantageous spacing being as shown in Fig. 2 in which we have attached a pick-up guard to every other prong 13. The action of the plurality of pick-up guards over very irregular or hummocky ground is to afford a mean or average movement to the sickle which permits the grain to be cut as close to the ground as is practical and at the same time does not permit the sickle to become clogged or fouled.

In Figs. 3 and 4 we have disclosed a modified form of pick-up guard embodying the principles of our invention. In this form of the device there is no direct connection between the prongs of the sickle and the pick-up guard. As in the previous case, the header to which the guard it attached comprises a framework 22 including a pair of angles 23 on which the lower run of the draper, not shown, operates and a pair of upper angles 24 for supporting the top run of the draper. The sickle 26 is attached to the leading angle 23 by suitable nuts and bolts 27.

Rather than secure each of the plurality of pick-up guards to the framework 22 individually, we preferably provide a base 28 to which they can be attached and then fasten the base to the header so that the entire unit can be quickly attached and detaced. The base 28 is preferably an angle perforated to receive through bolts 29 passing through the leading angle 23 for securing the base and the angle together. A flat strip 31 of spring steel is likewise held to the base with bolts 29 and projects forward. The base and the strip are further fastened together by an additional nut and bolt 32 in line with the through bolt 29.

To reinforce the base 28 and to distribute the strain imposed upon it to different parts of the framework there are preferably attached to the base several support arms 33 which comprise angles clipped by bolts 29 and 32 to the base and to the forward angle 23, and by bolts 34 to a spacer 36 and to the trailing angle 23. A very firm support is provided for the plurality of strips 31.

At the forward end of each strip 31 an elevator 37 is attached by a pair of nuts and bolts 38. The elevator corresponds generally in function and in contour to the bar 21, but being an entirely separate piece can be cheaply cast or forged. It comprises a pointed head 39 having a recess 41 for the reception of the strip 31, and a rearwardly extending tine 42 overlying the strip.

With either form of pick-up guard of our invention, the sickle is easily driven over a field with the sickle bar close to the ground without any danger of the sickle prongs being damaged or interrupting the progress of the machine by engaging the ground or débris on the ground.

We claim:—

In a harvester, a header, a plurality of pick-up guards, and means for attaching said guards to said header, including a bar adapted to be attached to the leading edge of said header, and braces adapted to be attached to said bar and said header.

In testimony whereof, we have hereunto set our hands.

AUGUST D. BRAASCH.
LESTER McDOW.
JOHN TWELLS.